United States Patent
Lee et al.

(10) Patent No.: US 10,193,582 B2
(45) Date of Patent: Jan. 29, 2019

(54) INTERFERENCE CANCELLATION METHOD AND BASE STATION APPARATUS THEREFOR

(71) Applicant: Samsung Electronics Co., Ltd., Suwon-si, Gyeonggi-do (KR)

(72) Inventors: Neung Hyung Lee, Seongnam-si (KR); Ik-Beom Lee, Seongnam-si (KR); Seungjoo Maeng, Seongnam-si (KR); Myonghee Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/565,576

(22) PCT Filed: Apr. 8, 2016

(86) PCT No.: PCT/KR2016/003679
§ 371 (c)(1),
(2) Date: Oct. 10, 2017

(87) PCT Pub. No.: WO2016/163790
PCT Pub. Date: Oct. 13, 2016

(65) Prior Publication Data
US 2018/0123625 A1    May 3, 2018

(30) Foreign Application Priority Data
Apr. 10, 2015  (KR) .................. 10-2015-0050791

(51) Int. Cl.
*H04B 1/10*        (2006.01)
*H04B 15/02*      (2006.01)
(Continued)

(52) U.S. Cl.
CPC ............. *H04B 1/10* (2013.01); *H04B 1/7097* (2013.01); *H04B 15/02* (2013.01); *H04B 17/327* (2015.01);
(Continued)

(58) Field of Classification Search
CPC ...... H04B 1/10; H04B 17/327; H04B 17/336; H04L 25/0256; H04W 72/1278
(Continued)

(56) References Cited

U.S. PATENT DOCUMENTS

2010/0069010 A1   3/2010  Karakayali et al.
2010/0202497 A1*  8/2010  Lee .................. H04B 7/024
                                            375/211
(Continued)

FOREIGN PATENT DOCUMENTS

EP           2858406 A1      4/2015

OTHER PUBLICATIONS

Krishna Balachandra et al., NICE: A Network Interference Cancellation Engine for Opportunistic Uplink Cooperation in Wireless Networks, IEEE Transactions on Wireless Communications, Feb. 2011, vol. 10, No. 2.
(Continued)

*Primary Examiner* — Sanh D Phu
(74) *Attorney, Agent, or Firm* — Jefferson IP Law, LLP

(57) ABSTRACT

The present disclosure relates to a pre-5th-generation (5G) or 5G communication system to be provided for supporting higher data rates beyond 4th-generation (4G) communication system such as long term evolution (LTE). A method of operating a base station for interference cancellation in a wireless communication system is provided. The method may include receiving, from a target terminal, an uplink data signal including at least one interference signal generated by at least one interference terminal; performing a primary
(Continued)

decoding for the uplink data signal; in accordance with decoding errors, generating a cancelling signal corresponding to an interference signal of the at least one interference terminal; performing a cancellation by applying the cancelling signal to the uplink data signal; and performing a secondary decoding for the uplink data signal to which the cancelling signal has been applied.

20 Claims, 15 Drawing Sheets

(51) Int. Cl.
| | |
|---|---|
| *H04B 1/7097* | (2011.01) |
| *H04W 28/02* | (2009.01) |
| *H04B 17/327* | (2015.01) |
| *H04B 17/336* | (2015.01) |
| *H04L 25/02* | (2006.01) |
| *H04W 72/12* | (2009.01) |

(52) U.S. Cl.
CPC ....... *H04B 17/336* (2015.01); *H04L 25/0256* (2013.01); *H04W 28/02* (2013.01); *H04W 72/1278* (2013.01)

(58) Field of Classification Search
USPC .......................................................... 455/312
See application file for complete search history.

(56) References Cited

U.S. PATENT DOCUMENTS

| | | |
|---|---|---|
| 2011/0201341 A1 | 8/2011 | Choudhury et al. |
| 2011/0243085 A1 | 10/2011 | Seo et al. |
| 2011/0255432 A1 | 10/2011 | Sambhwani et al. |
| 2012/0295629 A1 | 11/2012 | Lee et al. |
| 2012/0315935 A1 | 12/2012 | Wang Helmersson et al. |
| 2013/0044579 A1 | 2/2013 | Pan |
| 2014/0274096 A1 | 9/2014 | Stanwood et al. |
| 2014/0307569 A1 | 10/2014 | Barbieri et al. |
| 2017/0332364 A1* | 11/2017 | Sano ................. H04W 72/0406 |

OTHER PUBLICATIONS

Krishna Balachandra et al., Virtual Soft Handoff Enabled Dominant Interference Cancellation for Enhanced Uplink Performance in Heterogeneous Cellular Networks, In: 2012 IEEE Wireless Communications and Networking Conference Workshops (NCNCW), Apr. 1-4, 2012, pp. 109-114, ISBN: 978-1-4673-0681-2.

* cited by examiner

INTERFERENCE CANCELLATION METHOD AND BASE STATION APPARATUS THEREFOR

CROSS-REFERENCE TO RELATED APPLICATION(S)

This application is a U.S. National Stage application under 35 U.S.C. § 371 of an International application filed on Apr. 8, 2016 and assigned application number PCT/KR2016/003679, which claimed the benefit of a Korean patent application filed on Apr. 10, 2015 in the Korean Intellectual Property Office and assigned Serial number 10-2015-0050791, the entire disclosure of which is hereby incorporated by reference.

TECHNICAL FIELD

The present disclosure relates to a method and apparatus for canceling interference signals from a terminal of a neighboring cell in a cellular communication system.

BACKGROUND

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 28 GHz or 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

SUMMARY

According to various embodiments of the present disclosure, a method of operating a base station for interference cancellation in a wireless communication system may include: receiving, from a target terminal, an uplink data signal including at least one interference signal generated by at least one interference terminal; performing a primary decoding for the uplink data signal; generating a cancelling signal corresponding to an interference signal of the at least one interference terminal according to decoding errors; performing a cancellation by applying the cancelling signal to the uplink data signal; and performing a secondary decoding for the uplink data signal to which the cancelling signal has been applied.

According to various embodiments of the present disclosure, a method of operating a scheduling apparatus for interference cancellation in a wireless communication system may include: receiving at least one piece of uplink resource allocation information for each terminal and information related to channel estimation from a plurality of base stations; identifying at least one candidate interference terminal for each base station using the uplink resource allocation information; and transmitting the at least one identified candidate interference terminal to a corresponding base station.

According to various embodiments of the present disclosure, an apparatus of a base station for interference cancellation in a wireless communication system may include a transceiver and at least one processor. The at least one processor is configured: to receive, from a target terminal, an uplink data signal including at least one interference signal generated by at least one interference terminal; to perform a primary decoding for the uplink data signal, generate a cancelling signal corresponding to an interference signal of the at least one interference terminal according to errors of the decoding, to perform a cancellation by applying the cancelling signal to the uplink data signal, and to perform secondary decoding for the uplink data signal to which the cancelling signal has been applied.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
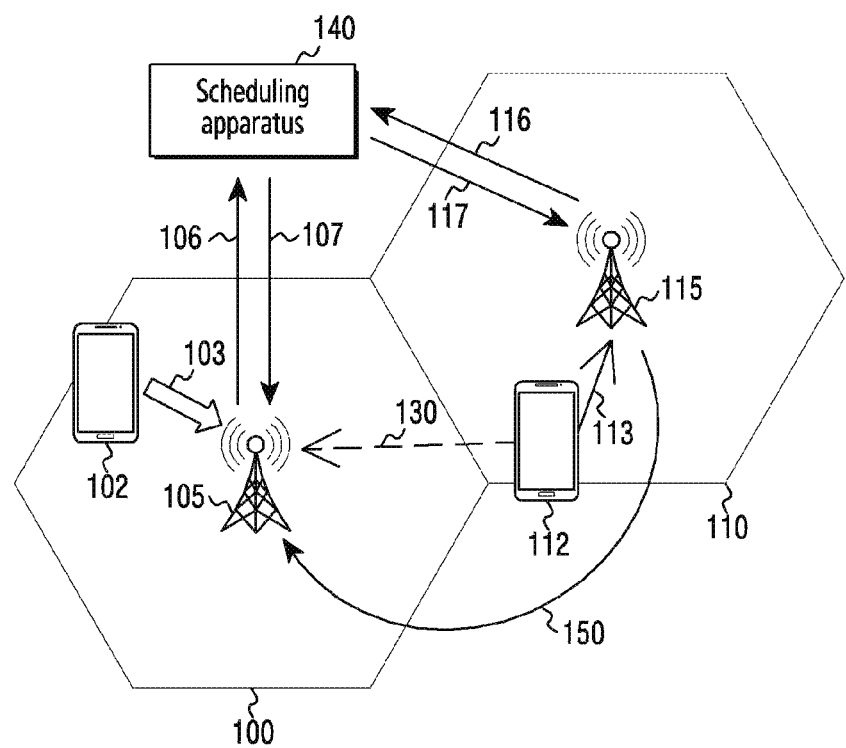
FIG. 1 illustrates a configurational diagram of a cellular communication system using a multi-cell interference cancellation technique, according to the embodiment of the present disclosure.

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Accordingly, one embodiment of the present disclosure provides an interference cancellation method in a cellular communication system, and further provides a base station apparatus thereof.

Another embodiment of the present disclosure provides a method and apparatus for canceling at least one dominant interference among uplink interferences of multiple terminals of a neighboring base station in a cellular communication system.

Another embodiment of the present disclosure provides a method and apparatus for decoding uplink data in a cellular communication system.

Another embodiment of the present disclosure provides a method and apparatus for improving uplink reception performance in a cellular communication system.

Another embodiment of the present disclosure provides a method and scheduling apparatus for determining a candidate interference terminal in a cellular communication system.

Another embodiment of the present disclosure provides a method and apparatus for determining a terminal causing dominant interference from a plurality of candidate interference terminals in a cellular communication system.

As described above, reception performance can be improved by performing decoding again after canceling the dominant interference according to detection of decoding errors. For example, if a receiver cancels dominant interference with a gain of 3 dB at a block error rate (BLER) of 10%, edge throughput may increase by about 40%.

Hereinafter, the operating principle of the present disclosure will be described in detail with reference to the accompanying drawings. In describing the present disclosure below, a detailed description of related known configurations or functions incorporated herein will be omitted when it is determined that the detailed description thereof may unnecessarily obscure the subject matter of the present disclosure. The terms which will be described below are terms defined in consideration of the functions in the present disclosure, and may be different according to users, intentions of the users, or customs. Therefore, the definitions of the terms should be made based on the contents throughout the specification.

Hereinafter, the present disclosure describes a multi-cell interference cancellation technique. In particular, the present disclosure describes a technique in which a target base station cancels a dominant interference signal from an interference terminal of a neighboring base station in response to detection of a decoding error in order to thereby improve reception performance.

Terms referring to devices, terms referring to signals, and terms referring to connection states, which are used in the following description, are examples used for the convenience of explanation. Therefore, the present disclosure is not limited to the terms described below, and other terms referring to objects having equivalent technical meanings can be used.

Depending on the type of network, other known terms may be used in place of "eNodeB" or "eNB", such as "base station" or "access point". For convenience, a base station, such as "eNodeB" and "eNB", may be used to represent a network infrastructure that provides wireless access to remote terminals. In addition, depending on the type of network, other known terms may also be used in place of "user equipment", "UE", or "terminal", such as "mobile station", "subscriber station", "remote terminal", "wireless terminal", or "user device". For convenience, the terminal, such as "user equipment" or "UE", may be a remote wireless device for accessing the base station wirelessly.

In the present disclosure, the term "multi-cell interference cancellation technique" may be used as technology for canceling a dominant interference signal received from an interference terminal of a neighboring base station when a target base station receives an uplink signal from a target terminal, thereby improving reception performance. In the present disclosure, a "target base station" may be used as a subject that removes at least one dominant interference from the received signals of the target terminal when interference signals are detected from a multitude of interference terminals of a neighboring base station. In the present disclosure, the term "target terminal" may be used as a subject that communicates with the target base station through wireless access, and may receive interference signals from terminals in a neighboring base station. A "neighboring base station" may be used as a base station adjacent to the target base station. An "interference terminal" may communicate with the neighboring base station through wireless access, and may be used as a subject that provides an uplink interference signal to the "target base station".

Recently, network traffic has increased due to the increasing use of electronic devices, such as smartphones and tablet PCs. In order to accommodate such a rapid increase in traffic, techniques for using a wide frequency bandwidth or for improving spectral efficiency have been proposed. Since frequency resources are limited, a cellular system or a multi-cell system reuse the same frequency (frequency-reuse factor=1) between cells in order to increase the system capacity. However, in the case where the frequency-reuse factor is 1, a terminal located at an edge of the cell may be interfered with by a neighboring base station in the downlink. Similarly, the base station may be interfered with by a terminal located at an edge of the cell of the neighboring base station in the uplink.

In order to mitigate inter-cell interference, an LTE-A (Long Term Evolution Advanced) system uses an interference rejection combining (IRC) technique. The IRC technique is a method for canceling inter-cell interference by using co-channel correlation that can be obtained by a terminal using multiple antennas even when interference occurs from a neighboring cell. The IRC technique may be regarded as a technique that takes into consideration the spatial characteristics of a received signal in the maximum ratio combining (MRC) reception technique, wherein a covariance matrix of an interference signal and noise is obtained and a composite coefficient is obtained based on the same. That is, the IRC technique is technology for reducing the influence of a sum of interferences without distinguishing individual interference.

Meanwhile, in most interference environments, there may be one dominant interference and a multitude of interferences that are lower than the dominant interference. However, since the IRC technique focuses on reduction in the influence of the sum total of interferences, the influence of the dominant interference may still remain.

Hereinafter, although various embodiments of the present disclosure will be described with reference to an example of an LTE (long-term evolution) communication system for the convenience of explanation, the present disclosure is not limited to the LTE communication system, and can be applied to other cellular communication systems.

FIG. 1 illustrates a configurational diagram of a cellular communication system using a multi-cell interference cancellation technique according to the embodiment of the present disclosure.

Referring to FIG. 1, the cellular communication system may be configured to include a scheduling apparatus 140, a target base station 105, a neighboring base station 115, a target terminal 102, and an interference terminal 112. Although the scheduling apparatus 140 is illustrated as a separate apparatus constituting the cellular communication system in FIG. 1, the scheduling apparatus 140 may be adopted as an element in the target base station 105 or the neighboring base station 115 in various embodiments. In various other embodiments, the neighboring base station 115 may operate as a target base station and the target base station 105 may operate as a neighboring base station.

The target base station 105 may communicate with terminals in the cell area 100. For example, the target base station 105 communicates with the target terminal 102 in the cell area 100 (103). In addition, the target base station 105 may receive and measure uplink reference signals from the terminals in the cell area 100, and may schedule uplink resources for the terminals based on the measured result.

In various embodiments, the target base station 105 may receive reference signals from terminals (hereinafter, referred to as neighboring terminals), which belong to a neighboring cell (e.g., a cell area 110 of the neighboring base station 115). A terminal that generates an interference signal toward the target base station, among the neighboring terminals, is called an interference terminal.

In addition, the target base station 105 may provide the scheduling apparatus 140 with uplink scheduling information and measurement information of uplink reference signals (for example, uplink reference signals of the target terminal 102 and the interference terminal 112).

In addition, the target base station 105 may receive information on at least one candidate interference terminal from the scheduling apparatus 140, may determine a dominant interference terminal from among the at least one candidate interference terminal, and thereafter, may perform decoding again by canceling an interference signal of the dominant interference terminal from the signals received upon decoding.

In FIG. 1, the dominant interference terminal may be the interference terminal 112. Although the interference terminal 112 is illustrated as the candidate interference terminal and the dominant interference terminal in FIG. 1, M dominant interference terminals may be determined from among N candidate interference terminals in various embodiments. Here, N is an integer equal to or greater than M.

In addition, although one target terminal is illustrated in the target base station 105 in FIG. 1, there may be a multitude of target terminals in the target base station 105 in various other embodiments. In the case of a multitude of target terminals, the target terminals to which a multi-cell interference cancellation technique is to be applied may be selected by the scheduling apparatus 140.

The neighboring base station 115 may communicate with terminals in the cell area 110. For example, the neighboring base station 115 communicates with the interference terminal 112 in the cell area 110 (113). In addition, when the interference terminal 112 communicates with the neighboring base station 115 in the cell area 110, a signal 113 transmitted from the interference terminal 112 to the neighboring base station 115 may act as an interference signal 130 with respect to the target base station 105.

Similarly, the neighboring base station 115 may receive and measure uplink reference signals from the terminals in the cell area 110, and may schedule uplink resources for the terminals based on the measured result. In various embodiments, the neighboring base station 115 may receive reference signals from terminals (hereinafter, referred to as neighboring terminals), which belong to the target cell (e.g., the cell area 100 of the target base station 105).

In addition, the neighboring base station 115 may provide the scheduling apparatus 140 with uplink scheduling information and measurement information of uplink reference signals (e.g., an uplink reference signal of the interference terminal 112).

In various embodiments, the target base station 105 and the neighboring base station 115 may decode uplink data, respectively, and may exchange the result of decodings (or decoded data) with each other (150). For example, the target base station 105 may provide a result of decoding of the first uplink data to the neighboring base station 115, and the neighboring base station 115 may provide a result of decoding of the second uplink data to the target base station 105.

The scheduling apparatus 140 may receive uplink scheduling information, information related to channel estimation, and uplink reference signal measurement information for each cell from the target base station 105 and the neighboring base station 115, respectively, using a separate interface or backhaul network (106 and 116). The uplink scheduling information may mean resource area allocation information for each terminal, the information related to channel estimation may be a parameter in relation to a demodulation reference signal (DM-RS), and the uplink reference signal may be a sounding reference signal (SRS).

In addition, the scheduling apparatus 140 may determine terminals (hereinafter, referred to as candidate interference terminals), which may cause interference with the target terminal 102, using the uplink scheduling information and the uplink reference signal measurement information. Further, the scheduling apparatus 140 may provide the target base station 105 and the neighboring base station 115 with information on at least one of the determined candidate interference terminals (107 and 117).

Figure 2:
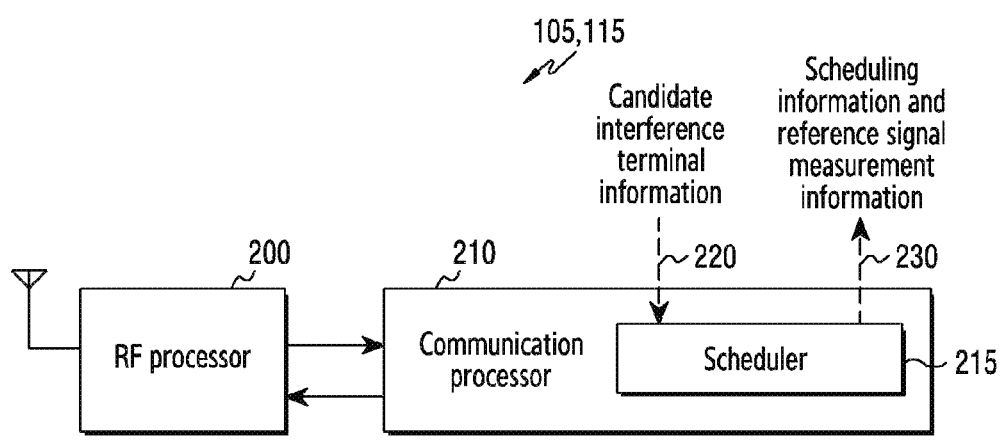
FIG. 2 illustrates a base station apparatus for interference cancellation in a multi-cell environment, according to the embodiment of the present disclosure.

FIG. 2 illustrates a base station apparatus for interference cancellation in a multi-cell environment according to the embodiment of the present disclosure.

Referring to FIG. 2, the base station may be configured to include an RF processor 200 and a communication processor 210. In the present disclosure, the term "communication processor" may be replaced with "modem". In addition, the communication processor 210 may include a scheduler 215. In various embodiments, the scheduler 215 may be an independent component of the base station apparatus, which is separated from the communication processor 210.

The RF processor 200 may: convert an RF signal into a baseband signal; provide the baseband signal to the communication processor 210; and convert a baseband signal from the communication processor 210 into an RF signal in order to thereby output the same through an antenna.

The RF processor 200 may include: a low-noise amplifier (LAN) for suppressing noise; a mixer for converting an RF signal into an IF signal or a baseband signal or for converting a baseband signal or an IF signal into an RF signal; a voltage gain amplifier (VCO) for outputting, to the mixer 303, an oscillation frequency controlled through a voltage applied to an input; and a power amplifier for amplifying a transmitted RF signal.

The communication processor 210 may process a baseband signal based on a corresponding communication scheme. For example, the communication processor 210 may perform signal detection, interference cancellation, channel estimation, error detection, modulation/demodulation, or channel coding/decoding based on the corresponding communication scheme.

The scheduler 215 may allocate uplink or downlink resources for performing communication with the terminals based on feedback information {e.g., CQI (Channel Quality Indicator)} or a channel estimation result from the terminals. The uplink resource means a resource through which the terminal transmits uplink data to the base station or a resource through which the base station receives uplink data from the terminal, and the downlink resource means a resource through which the base station transmits downlink data to the terminal or a resource through which the terminal receives downlink data from the base station.

In various embodiments of the present disclosure, the scheduler 215 may provide the scheduling apparatus 140 with uplink scheduling information and reference signal measurement information (230). The uplink scheduling information may include resource area information {e.g., resource block (RB) allocation information}, which is allocated to each terminal, and parameters related to channel estimation {e.g., a demodulation reference signal (DM-RS)}, and the reference signal may be a sounding reference signal.

In addition, the scheduler 215 may receive candidate interference terminal information from the scheduling apparatus 140 (220). The candidate interference terminal information may relate to neighboring terminals communicating with the neighboring base stations, which may interfere with the target terminal.

In various embodiments of the present disclosure, when decoding received uplink data signals, the communication processor 210 may cancel at least one dominant interference signal from the received uplink data signals by applying a multi-cell interference cancellation technique, and may perform re-decoding of the uplink data signals from which the interference signal has been removed. The at least one dominant interference signal may be determined based on the candidate interference terminal information.

In various embodiments, a communication module (not shown) may be added for exchanging information between schedulers, or between communication processors, of other cells according to the multi-cell interference cancellation technique of the communication processor 210. If the base station adopts a communication module for exchanging information, the communication module of the base station is connected to communication modules of other cells in order to thereby transmit and receive information (e.g., uplink scheduling information, reference signal measurement information, candidate interference terminal information, and the like).

For example, if a base station has a communication module or a communication interface for exchanging information between cells, the target base station 105 may reproduce an interference signal from the interference terminal 130, and may remove the reproduced interference signal from a sum of signals received from the target terminal 102 and the interference terminal 112, thereby determining a signal of the target terminal 102. In order to reproduce the interference signal from the interference terminal 112, the target base station 105 obtains decoding information (or a result of decoding) of the interference terminal 112 from the neighboring base station 115, and also obtains resource allocation information of the interference terminal 112 for channel estimation of the interference terminal 112. Further, the reproduced interference signal by the target base station may be referred as a cancelling signal. The cancelling signal may be applied to an uplink signal which is received from the terminal, so that interference cancellation may be implemented.

In various other embodiments, if there is no communication module for exchanging information between the schedulers or between the communication processors, the communication processor 210 may independently perform a multi-cell interference cancellation technique without exchanging information.

For example, if the base station does not have a communication module or a communication interface for exchanging information between cells, the target base station 105 cannot receive the information on the interference terminal 112 from the neighboring base station 115. Therefore, the target base station 105 may detect interference by itself and perform blind estimation of a corresponding parameter, and may perform channel estimation of the interference based on the same in order to thereby perform joint detection and removal of the interference.

The communication processor 210 will be described in detail with reference to FIG. 3 below.

Figure 3:
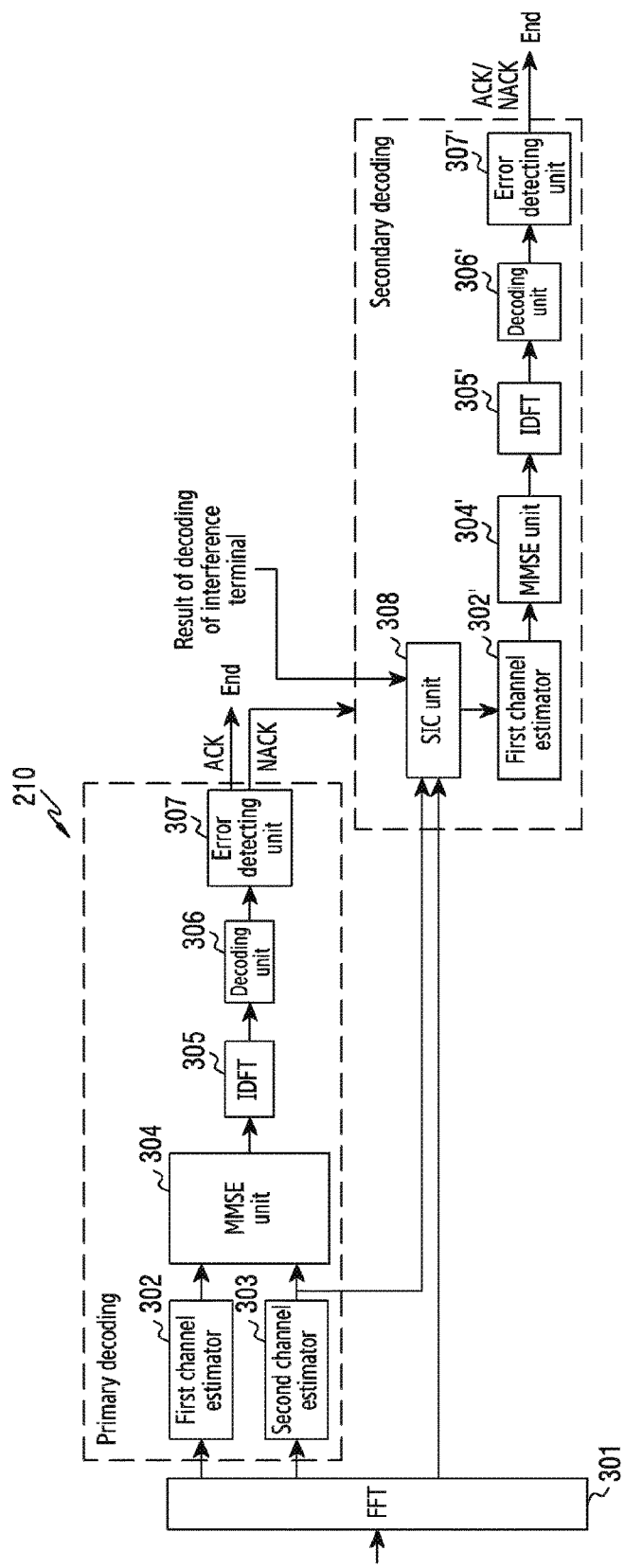
FIG. 3 illustrates a detailed functional block diagram of a communication processor of the base station apparatus shown in FIG. 2, according to the embodiment of the present disclosure.

FIG. 3 illustrates a detailed functional block diagram of the communication processor of the base station apparatus shown in FIG. 2, according to the embodiment of the present disclosure.

Referring to FIG. 3, the communication processor 210 may include a fast Fourier transform (FFT) unit 301, a first channel estimator 302, a second channel estimator 303, a minimum mean-square error (MMSE) unit 304, an inverse discrete Fourier transform (IDFT) unit 305, a decoding unit 306, an error detecting unit 307, and a successive interference cancellation (SIC) unit 308.

For secondary decoding, the communication processor 210 may further include a first channel estimator 302, a minimum mean-square error (MMSE) unit 304, an inverse discrete Fourier transform (IDFT) unit 305, a decoding unit 306, and an error detecting unit 307.

Although, in order to perform the primary decoding and the secondary decoding, the first channel estimators 302, the second channel estimator 303, the minimum mean-square error (MMSE) units 304, the inverse discrete Fourier transform (IDFT) units 305, the decoding units 306, and the error detecting units 307 are separately illustrated in FIG. 3, the primary decoding and the secondary decoding may be performed through a single first channel estimator 302, a single minimum mean-square error (MMSE) unit 304, a single inverse discrete Fourier transform (IDFT) unit 305, a single decoding unit 306, and a single error detecting unit 307 in sequence.

The FFT unit 301 performs a Fourier transform of a signal (baseband signal) received from the RF processor 200. A time-domain signal may be transformed into a frequency-domain signal by the Fourier transform. The frequency-domain signal may include a data signal and a reference signal (e.g., sounding signal or DM-RS) transmitted using carriers having different frequencies. In various embodiments, depending on the type of network, the reference signal may be replaced with a pilot signal.

The first channel estimator 302 may measure a reference signal of the target terminal among the frequency-domain signals, and may perform channel estimation with respect to the target terminal.

The second channel estimator 303 may measure a reference signal of the interference terminal among the frequency-domain signals, and may perform channel estimation with respect to the interference terminal.

The MMSE unit 304 cancels an interference signal from data signals among the frequency-domain signals through MMSE detection to thereby recover the transmission signal, and outputs the recovered transmission signal to the IDFT unit 305.

The IDFT unit 305 performs an inverse discrete Fourier transform on an output signal from the MMSE unit 304. Through the inverse discrete Fourier transform, the output signal from the MMSE unit 304 is transformed from a frequency-domain data signal into a time-domain data signal.

The decoding unit 306 performs channel decoding with respect to the time-domain data signal from the IDFT unit 305 based on a corresponding channel decoding method. For example, the channel decoding method may be a turbo decoding method or a convolutional decoding method.

The error detecting unit 307 may perform error detection on the decoded data. For example, the error detecting unit 307 may detect whether or not an error occurs using a cyclic redundancy check (CRC). The CRC uses cyclic binary code in order to detect an error occurring in the process of data transmission, wherein data is divided into blocks at the transmitting side and each block having a cyclic code added as an extra code thereto, which is obtained through a special calculation involving binary polynomial expressions, is transmitted, and the presence of a transmission error can be checked at the receiving side depending on whether or not the cyclic code is obtained by the same calculation.

When an error is detected by the error detecting unit 307, the SIC unit 308 reproduces an interference signal, cancels the reproduced interference signal from frequency-domain reception signals of the FFT unit 301, and outputs, to the first channel estimator 302, the frequency-domain reception signal of the FFT unit 301 from which the reproduced interference signal has been canceled. The interference signal may be reproduced based on the result of decoding of the interference terminal from the neighboring base station and based on the channel estimation result with respect to the interference terminal, which has been determined by the second channel estimator 303. Further, the reproduced interference signal by the SIC unit 308 may be referred as a cancelling signal. The cancelling signal may be applied to an uplink signal which is received from the terminal, so that interference cancellation may be implemented.

The reception signal, from which the interference signal has been removed by the SIC unit 308, may be decoded through the first channel estimator 302', the MMSE unit 304', the IDFT unit 305', the decoding unit 306', and the error detecting unit 307' (referred to as secondary decoding).

On the contrary, if no error is detected by the error detecting unit 307, secondary decoding is not performed. In addition, the result of decoding may be provided to the neighboring base station.

Figure 4:
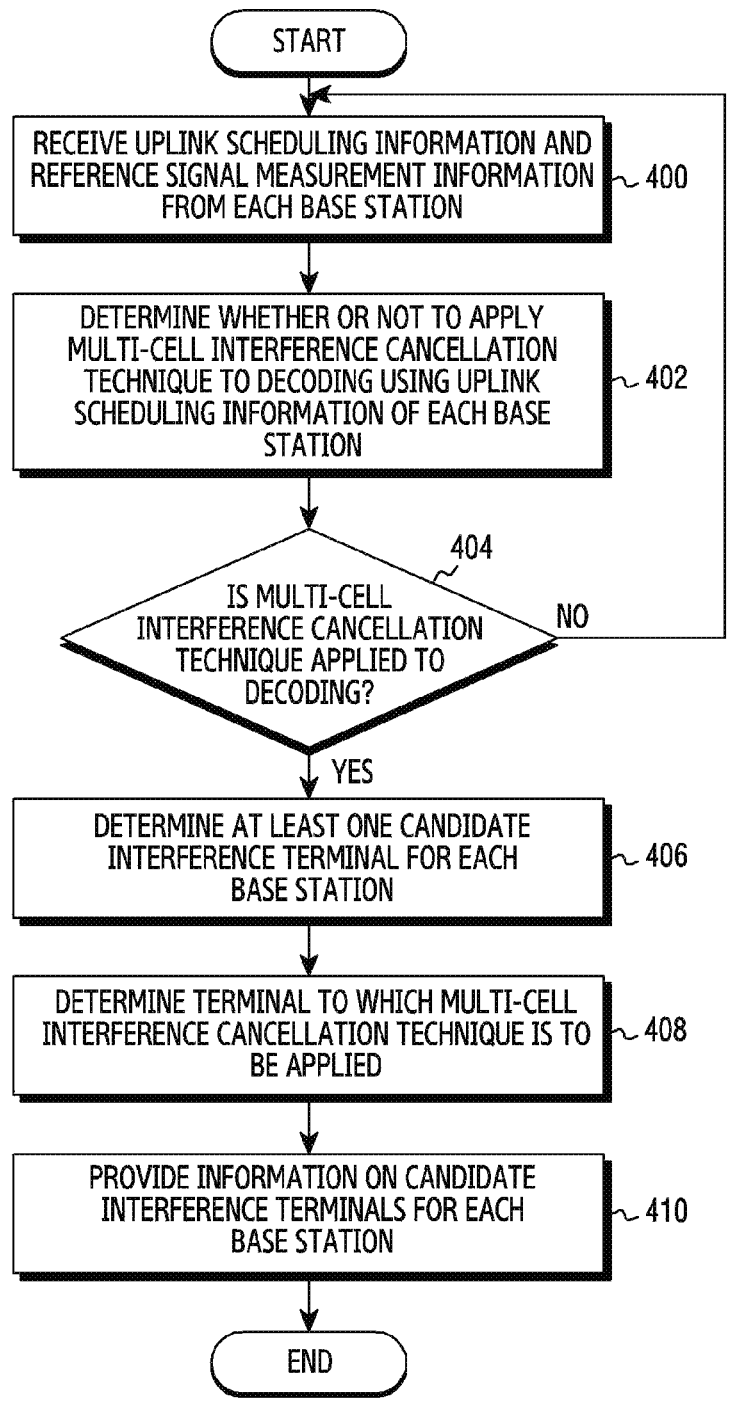
FIG. 4 illustrates a flowchart showing the operation of a scheduling apparatus for interference cancellation in a multi-cell environment, according to the embodiment of the present disclosure.

FIG. 4 illustrates a flowchart showing the operation of a scheduling apparatus for interference cancellation in a multi-cell environment according to the embodiment of the present disclosure.

Referring to FIG. 4, in operation 400, the scheduling apparatus 140 receives uplink scheduling information and reference signal measurement information of terminals from a plurality of base stations.

The uplink scheduling information may include uplink resource allocation information (e.g., RB allocation information) of the corresponding terminals and information (e.g., DM-RS-related information) related to uplink channel estimation of the corresponding terminals. The DM-RS is transmitted from the terminal to the base station through a physical uplink shared channel (PUSCH) in an LTE system, and is used for channel estimation. In addition, the sequence used in the DM-RS is associated with physical cell identification (PCI), a cyclic shift, a parameter related to RB allocation, of a cell communicating with the corresponding terminal. Thus, if the base station has no information about physical cell identification (PCI), a cyclic shift, and a parameter related to RB allocation of a cell, it may be difficult to estimate a channel accurately. Accordingly, the scheduler 215 of the target base station should determine, or should be provided with, parameter information related to a DMRS sequence of the interference terminal of the neighboring base station, as well as parameter information related to a DMRS sequence of the target terminal.

The scheduling apparatus 140 may determine whether or not to apply the multi-cell interference cancellation technique to decoding using the uplink scheduling information of each base station in operation 402. For example, if the total throughput of cells related to one communication processor (or modem chip) is greater than a threshold value (e.g., 150 Mbps), the scheduling apparatus 140 may not apply the multi-cell interference cancellation technique to all of the terminals belonging to the corresponding cells. This is due to the fact that the throughput limitation of the communication processor should be considered when the multi-cell interference cancellation technique is applied.

In the case where the multi-cell interference cancellation technique is applied to decoding with respect to all of the terminals belonging to the corresponding cells, the scheduling apparatus 140 may proceed to operation 406. Otherwise, the scheduling apparatus 140 may proceed to operation 400.

The scheduling apparatus 140 may determine at least one candidate interference terminal by estimating interference for each base station in operation 406. For example, the scheduling apparatus 140 may estimate the amount of interference that the interference terminal 112 of FIG. 1 exerts on the target base station 105, and may determine the candidate interference terminals based on the estimated amount of interference. A detailed description of the interference estimation will be given below with reference to FIG. 5.

In operation 408, the scheduling apparatus 140 may select a terminal to which the multi-cell interference cancellation technique is to be applied by using a signal-to-interference ratio (SIR) or a signal-to-interference-plus-noise ratio (SINR) for each target terminal because the number of resource areas that can be processed based on the multi-cell interference cancellation technique may be limited. A procedure for selecting a target terminal to which the multi-cell interference cancellation technique is to be applied will be described with reference to FIG. 6 below.

In operation 410, the scheduling apparatus 140 may provide the respective base stations with information on at least one candidate interference terminal related to the target terminal to which the multi-cell interference cancellation technique is to be applied.

That is, a plurality of target terminals may be included in the target base station depending on the locations of the terminals and resource allocation thereof, and the respective target terminals may be interfered with by the related candidate interference terminals.

Therefore, the scheduling apparatus 140 may determine candidate interference terminals for each of a plurality of target terminals, and may determine at least one target terminal to which the multi-cell interference cancellation technique is to be applied from among the plurality of target terminals.

Figure 5:
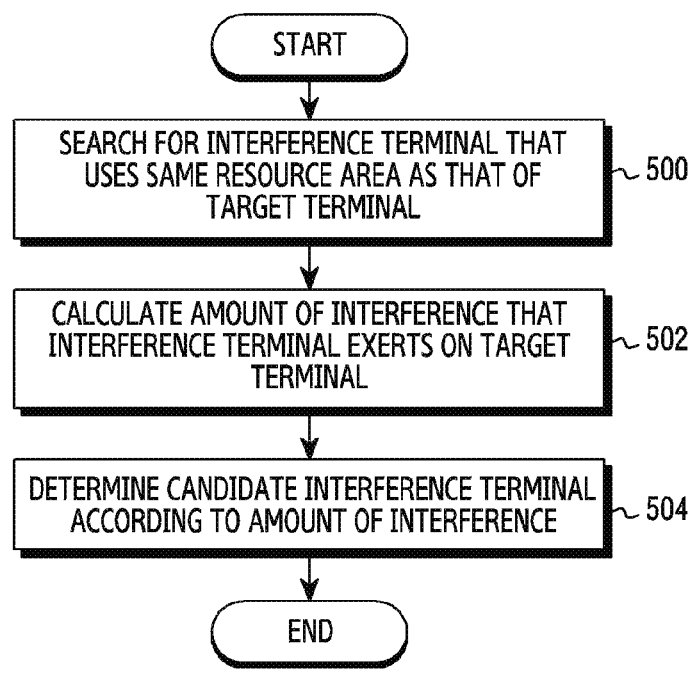
FIG. 5 illustrates a flowchart showing the operation of a scheduling apparatus for determining a candidate interference terminal in a multi-cell environment, according to the embodiment of the present disclosure.

FIG. 5 illustrates a flowchart showing the operation of a scheduling apparatus for determining candidate interference terminals in a multi-cell environment according to the embodiment of the present disclosure.

Referring to FIG. 5, in operation 500, the scheduling apparatus 140 may search for at least one interference terminal that uses the same resource area as that of the target terminal based on the uplink scheduling information collected from the target base station and the neighboring base station.

The scheduling apparatus 140 may calculate the amount of interference that each interference terminal exerts on the target terminal in operation 502.

For example, the scheduling apparatus 140 may determine the amount of interference by multiplying measurement values of reference signals (e.g., reception power) of the interference terminals provided by the target base station by the number of sub-resource blocks that overlap the resource area of the target terminal and the resource area of the interference terminal as shown in Equation 1 below (see FIG. 12).

$$Rx\_power\_interference[n] = Rx\_power\_UE[n] * N\_RB\_overlap[n] \quad \text{[Equation 1]}$$

Here, Rx_power_interference[n] is the amount of interference that a terminal {e.g., an interference terminal (n)} of a neighboring cell exerts on the resource area allocated to a target terminal, and Rx_power_UE[n] is the reception power of the interference terminal (n), which is measured by the target base station. In addition, N_RB_overlap[n] is the number of sub-resource blocks that overlap the resource area of the target terminal and the resource area of the interference terminal.

The scheduling apparatus 140, in operation 504, may determine candidate interference terminals according to the calculated amount of interference. For example, the scheduling apparatus 140 may sort the amounts of interference in order of magnitude, and may determine a predetermined number of terminals having a large amount of interference as candidate interference terminals.

Figure 6:
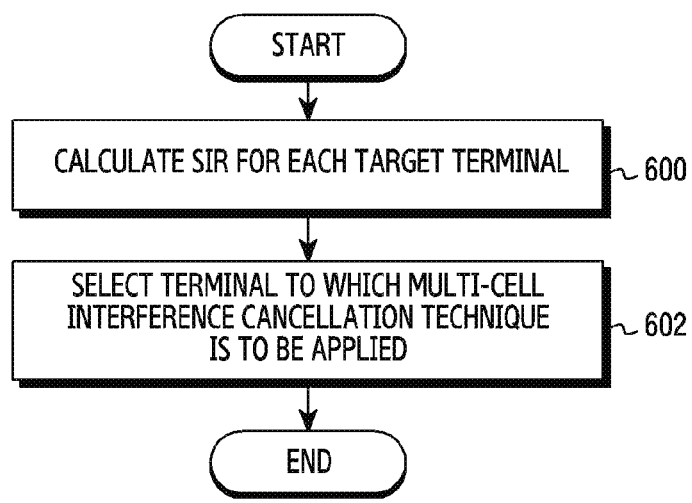
FIG. 6 illustrates a flowchart showing the operation of a scheduling apparatus for selecting a terminal to which a multi-cell interference cancellation technique is applied, according to the embodiment of the present disclosure.

FIG. 6 illustrates a flowchart showing the operation of a scheduling apparatus for selecting a terminal to which a multi-cell interference cancellation technique is to be applied, according to the embodiment of the present disclosure.

In operation 600, the scheduling apparatus 140 calculates a signal-to-interference ratio (SIR) for each target terminal of the target base station. For example, the scheduling apparatus 140 calculates a sum of reception power of the interference terminals related to the corresponding target terminal (for example, measuring reference signals of the interference terminals), and then calculates ratios of the reception power of the corresponding target terminal to the reception power of the related interference terminals.

In operation 602, the scheduling apparatus 140 may select a terminal to which the multi-cell interference cancellation technique is to be applied based on the SIR of each target terminal in the target base station. For example, the scheduling apparatus 140 arranges target terminals of the target base station in ascending order of SIR, and selects terminals, to which the multi-cell interference cancellation technique is to be applied, from the target terminals having small SIRs until the following conditions are satisfied.

Condition 1: The total number of resource areas of a terminal, to which the multi-cell interference cancellation technique is to be applied, is equal to or less than the number of resource areas that can be processed by the multi-cell interference cancellation technique.

Condition 2: The total number of resource areas of a terminal, to which the multi-cell interference cancellation technique is not to be applied, is equal to or less than (the total number of resource areas)$-\alpha*$(the total number of resource areas of a terminal to which the multi-cell interference cancellation technique is to be applied).

Condition 3: The sum of throughputs of terminals, to which the multi-cell interference cancellation technique is to be applied, is equal to or less than a threshold value.

Figure 7:
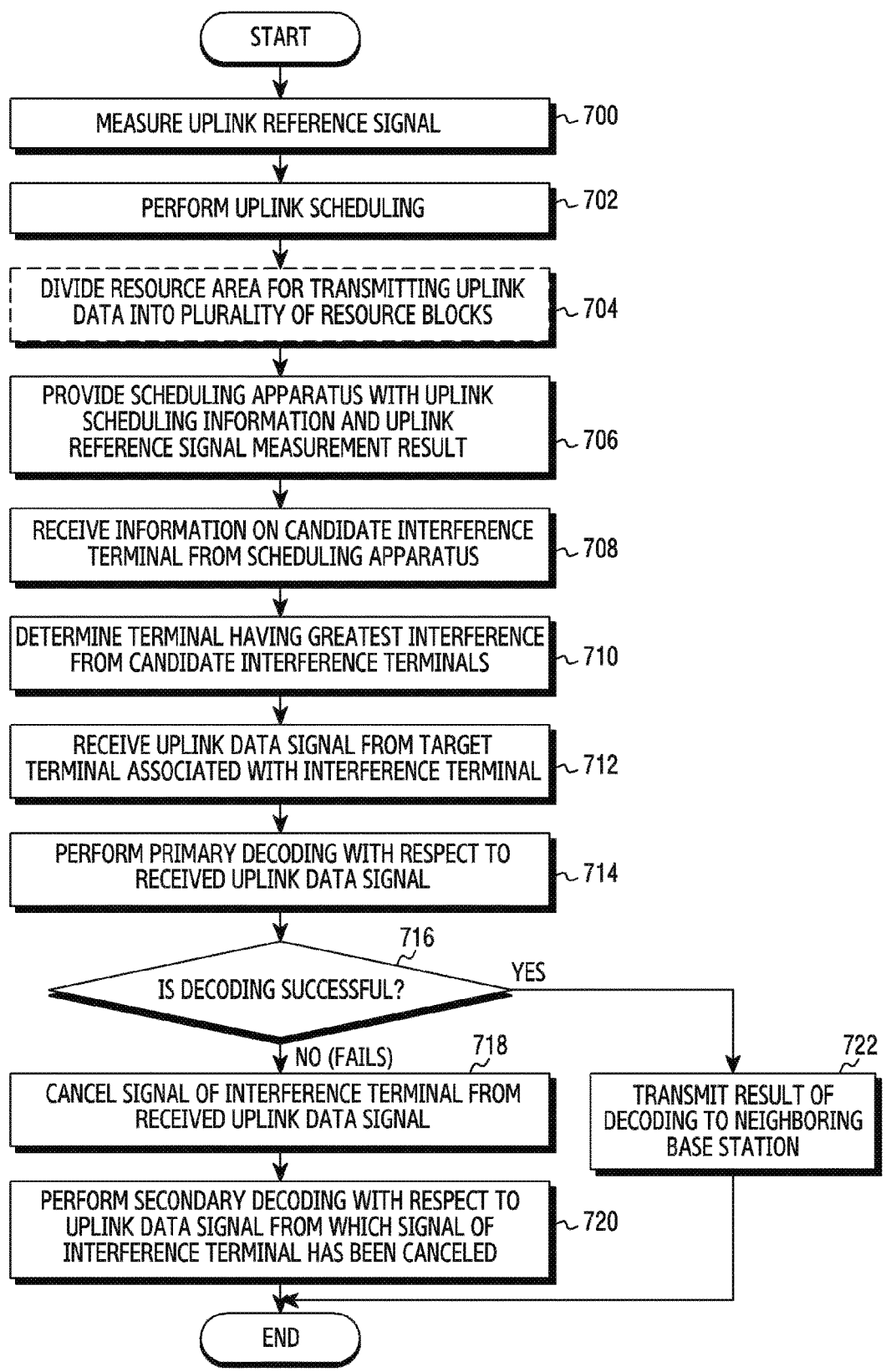
FIG. 7 illustrates a flowchart showing the operation of a base station apparatus for interference cancellation in a multi-cell environment, according to the embodiment of the present disclosure.

FIG. 7 illustrates a flowchart showing the operation of a base station apparatus for interference cancellation in a multi-cell environment according to the embodiment of the present disclosure.

Referring to FIG. 7, in operation 700, the target base station measures reference signals received from the target terminals and the neighboring terminals. At this time, the reference signals may be measured for a long time.

The target base station, in operation 702, may perform uplink scheduling based on the reference signal measurement. For example, the target base station may allocate resource areas for transmission of the uplink data for the target terminals.

Figure 10:
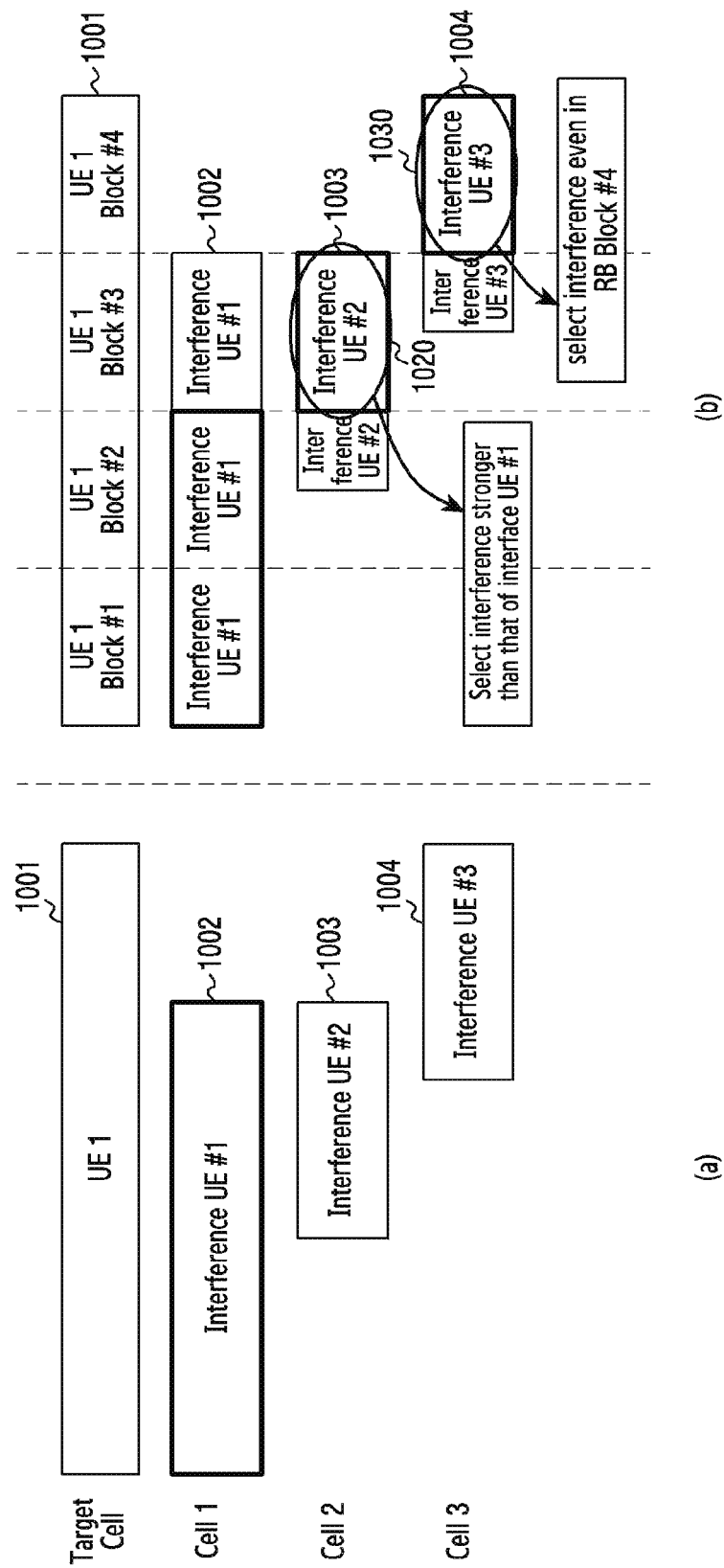
FIG. 10 illustrates an example of selecting and then canceling interference, according to the embodiment of the present disclosure.

In operation 704, the target base station may divide the resource areas of the allocated target terminals into a plurality of sub-resource blocks for the multi-cell interference cancellation technique. For example, as shown in FIG. 10, the target base station can improve the accuracy in interference cancellation by dividing the allocated resource area into a plurality of sub-resource blocks.

In various embodiments, the operation 704 of dividing the resource areas of the allocated target terminals into a plurality of sub-resource blocks for the multi-cell interference cancellation technique may be performed by the scheduling apparatus 140.

In operation 706, the target base station provides the scheduling apparatus with uplink scheduling information and uplink reference signal measurement results for the terminals. The uplink scheduling information may include uplink resource allocation information for each terminal and information related to channel estimation for the interference terminal.

In operation 708, the target base station may receive information on at least one candidate interference terminal related to the target terminal from the scheduling apparatus. In various embodiments, the target base station may receive information on candidate interference terminals related to a plurality of target terminals.

The target base station, in operation 710, may determine a dominant interference terminal from at least one candidate interference terminal based on the instantaneous reception power of at least one candidate interference terminal. For example, the interference terminal having the largest instantaneous reception power may be determined to be the dominant interference terminal among at least one candidate interference terminal. At this time, a dominant interference terminal may be selected for each sub-resource block. The sub-resource block is a unit resulting from division of a resource area allocated to the target terminal into sub-resource blocks.

In various embodiments, the target base station may determine at least one dominant interference terminal from a plurality of candidate interference terminals.

The target base station may receive an uplink data signal from a target terminal associated with the dominant interference terminal in operation 712. At this time, the target base station simultaneously receives signals from other interference terminals, as well as the dominant interference terminal.

The target base station may perform primary decoding with respect to the received uplink data signal in operation 714. The detailed decoding procedure will be described in FIG. 8 below.

In operation 716, when the decoding is successful (for example, there is no error in the decoded uplink data), the target base station may proceed to operation 722 in order to thereby transmit the result of decoding (i.e., the decoded uplink data) to the neighboring base station.

In operation 716, when the decoding fails (for example, when there is an error in the decoded uplink data), the target base station may proceed to operation 718 in order to thereby cancel a signal of the dominant interference terminal from the received uplink data signals including signals of other interference terminals.

In operation 720, the target base station may perform secondary decoding with respect to the received uplink data signal from which the signal of the dominant interference terminal has been canceled.

Figure 8:
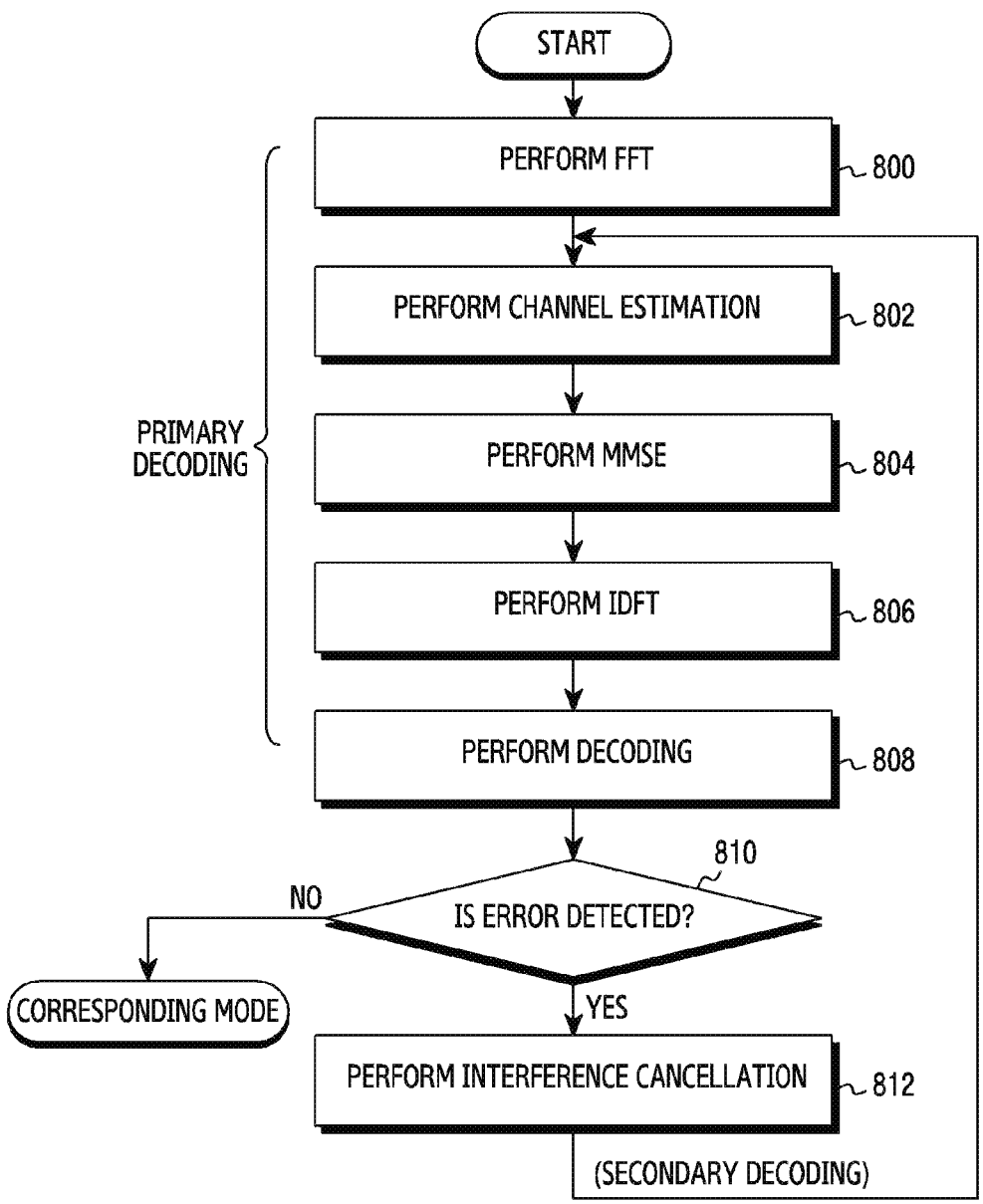
FIG. 8 illustrates a flowchart showing the operation of a base station apparatus for data decoding of a base station apparatus, according to the embodiment of the present disclosure.

FIG. 8 illustrates a flowchart showing the operation of a target base station apparatus for data decoding of a base station according to the embodiment of the present disclosure.

Referring to FIG. 8, in operation 800, the target base station performs a Fourier transform with respect to the received signals including the signals of other interference terminals. A time-domain signal may be transformed into a frequency-domain signal by the Fourier transform. The frequency-domain signal may include a data signal and a reference signal (e.g., sounding signal or DM-RS) transmitted using carriers having different frequencies. In various embodiments, the reference signal may be replaced with a pilot signal depending on the type of network.

In operation 802, the target base station may measure a reference signal of the target terminal among the frequency-domain signals in order to thereby perform channel estimation with respect to the target terminal, and may measure a reference signal of the interference terminal among the frequency-domain signals in order to thereby perform channel estimation with respect to the interference terminal.

In operation 804, the target base station cancels an interference signal from the data signals among the frequency-domain signals through MMSE detection, thereby recovering the transmission signal.

In operation 806, the target base station performs an inverse discrete Fourier transform with respect to the recovered transmission signal. The recovered transmission signal is transformed from the frequency-domain data signal to the time-domain data signal through the inverse discrete Fourier transform.

In operation 808, the target base station performs channel decoding with respect to the recovered transmission signal of the time domain based on a corresponding channel decoding method. For example, the channel decoding method may be a turbo decoding method or a convolutional decoding method.

In operation 808, the target base station may perform error detection on the decoded data. For example, a cyclic redundancy check (CRC) may be used as the error detection method.

If an error is detected in the decoded data, the target base station, in operation 812, may reproduce interference signals of at least one dominant interference terminal, and may sequentially cancel the reproduced interference signals from the reception signals including signals of other interference terminals.

In addition, the target base station may perform secondary decoding by repeating operations 802 to 810 with respect to the reception signal from which the interference signals have been removed.

On the contrary, if no error is detected in the decoded data, the target base station may perform a corresponding mode. For example, in the corresponding mode, the target base station may provide the decoded data or results to the neighboring base station.

Figure 9:
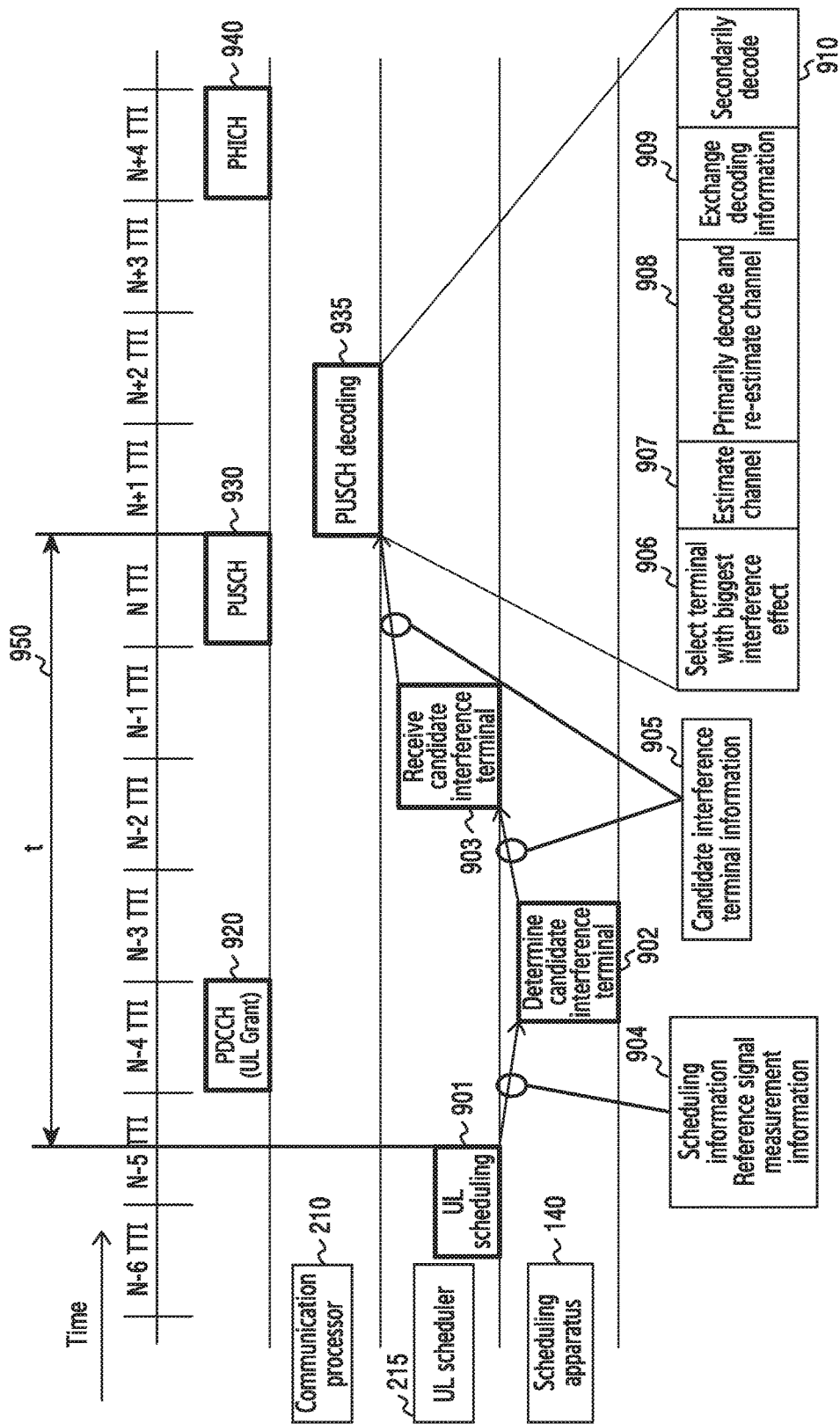
FIG. 9 illustrates an operational timing diagram for interference cancellation in a multi-cell environment, according to the embodiment of the present disclosure.

FIG. 9 illustrates an operational timing diagram for interference cancellation in a multi-cell environment according to the embodiment of the present disclosure. In particular, FIG. 9 illustrates the case of using sequential interference cancellation (SIC) during the transmission of uplink data in an LTE system.

Referring to FIG. 9, an uplink scheduler 215 may allocate resources for uplink data transmission to a target terminal based on the uplink reference signal measurement in the (N−5)th transmission time interval (TTI) (901). A control signal may be transmitted from the base station to the terminal through a physical downlink control channel (PDCCH) in the (N−4)th TTI (920), and uplink shared data may be transmitted from the terminal to the base station through a physical uplink shared channel (PUSCH) in the Nth TTI (930).

Meanwhile, the uplink scheduler 215 may provide the scheduling apparatus 140 with uplink scheduling information and reference signal measurement information (904).

The scheduling apparatus 140 may determine at least one candidate interference terminal associated with the target terminal based on the uplink scheduling information and the reference signal measurement information, which are provided from the uplink scheduler 215 (902).

In addition, the scheduling apparatus 140 may provide information on at least one determined candidate interference terminal to the uplink scheduler 215 and the communication processor 210.

When decoding the uplink data transmitted through the PUSCH, the uplink scheduler 215 may receive information necessary for the multi-cell interference cancellation technique from the uplink scheduler 215 (903). In addition, if necessary, the uplink scheduler 215 may provide the communication processor 210 with information necessary for the multi-cell interference cancellation technique.

Meanwhile, the operation in which the scheduling apparatus 140 receives the information on the candidate interference terminal from the scheduling apparatus 140 should be completed before decoding the PUSCH uplink data (950). For example, if the communication processor 210 decodes the PUSCH in the (N+1)th TTI, the information on the candidate interference terminal should be transmitted from the scheduling apparatus 140 to the communication processor 210 prior to the (N+1)th TTI.

The communication processor 210 may decode the PUSCH based on the information on the candidate interference terminal in the (N+1)th TTI (935).

For example, the communication processor 210 determines a terminal (e.g., a dominant interference terminal) having the greatest interference influence from among the candidate interference terminals (906), performs channel estimation with respect to the target terminal and the interference terminal (907), and then perform primary decoding based on the channel estimation (908). At this time, when the primary decoding fails, the communication processor 210 may cancel the signal of the dominant interference terminal from the received signals, and may then perform the channel estimation again. When the primary decoding is successful, the communication processor 210 may exchange decoding information with the corresponding neighboring base stations without performing channel re-estimation (909).

In addition, when the primary decoding fails, the communication processor 210 may perform secondary decoding based on the channel re-estimation (910).

Next, the base station may transmit, to the terminal, a physical hybrid ARQ indicator channel (PHICH) in response to the PUSCH decoding (935).

More specifically, the channel estimation may be performed through the DM-RS contained in the PUSCH. The sequence included in the DMRS relates to physical cell identification (PCI), a cyclic shift, and a parameter related to allocated RBs, of a cell to which the corresponding terminal belongs. Thus, if the communication processor 210 has no information on the same, it is difficult to perform accurate channel estimation. Therefore, the uplink scheduler 215 collects parameter information in relation to a DMRS sequence of an interference terminal in the neighboring cell, as well as parameter information in relation to a DMRS sequence of the target terminal, and provides the same to the communication processor 210. When the channel estimation is performed, a desired signal component is detected based on a minimum mean-square error (MMSE) technique with respect to the data of the target terminal and the interference terminal. Thereafter, the communication processor 210 performs an inverse discrete Fourier transform (IDFT) and turbo decoding, and performs CRC on the result thereof. If the CRC result has no error (ACK), the decoding of the target terminal is terminated and the decoding information (or result of decoding) of the target terminal is transmitted to a predetermined communication processor of the neighboring cell. If the CRC result has an error (NACK), the decoding of the target terminal is performed once more after the successive interference cancellation (SIC).

After the SIC, in the secondary decoding, the interference is reproduced using the result of decoding of the interference terminal in the neighboring cell and the channel estimation of the interference terminal. After the reproduced interference is canceled from the next reception signal, channel estimation is performed again with respect to the target terminal, and then the MMSE operation, the IDFT, the turbo decoding, and the CRC check are sequentially performed.

Diagrams (a) and (b) of FIG. 10 illustrate an example of canceling interference after selecting the same according to the embodiment of the present disclosure.

Diagram (a) of FIG. 10 illustrates an example of removing a signal of one interference terminal without dividing the resource area 1001 allocated to UE #1 into sub-resource blocks. For example, a part of the resource area 1001 of a target terminal UE #1 may overlap a resource area 1002 allocated to an interference UE #1 of a neighboring cell 1, a resource area 1003 allocated to an interference UE #2 of a neighboring cell 2, and a resource area 1004 allocated to an interference UE #3 of a neighboring cell 3. In the case where the resource area 1001 allocated to the UE #1 is not divided into sub-resource blocks, if the interference UE #1 of the neighboring cell 1 is determined to be a dominant interference terminal from among three candidate interference terminals (the interference UE #1, the interference UE #2, and the interference UE #3), only the interference signal of the interference UE #1 may be removed from the signals of the UE #1 including interference signals in the target cell.

If only the size of the resource area 1003 of the interference UE #2 is considered, the interference from the interference UE #2 may be stronger than the interference from the interference UE #1, and if only the size of the resource area 1004 of the interference UE #3 is considered, the interference from the interference UE #3 may be stronger than the interference from the interference UE #1.

Therefore, in order to improve the accuracy of interference selection, the signal of the interference terminal may be canceled by dividing the resource area 1001 allocated to the UE #1 into a plurality of sub-resource blocks as shown in diagram (b) of FIG. 10. For example, the resource area 1001 allocated to the UE #1 of the target cell may be divided into four sub-resource blocks. A single sub-resource block may include a plurality of RBs.

When the resource area 1001 allocated to the UE #1 of the target cell is divided into four sub-resource blocks, the interference UE #1 may be determined to be a dominant interference terminal for the first sub-resource block and the second sub-resource block of the resource area 1001 allocated to the UE #1, the interference UE #2 may be determined to be a dominant interference terminal for the third sub-resource block of the resource area 1001 allocated to the UE #1 (1020), and the interference UE #3 may be determined to be a dominant interference terminal for the fourth sub-resource block of the resource area 1001 allocated to the UE #1 (1030).

Therefore, in various embodiments of the present disclosure, when the resource area allocated to the target terminal is divided into a plurality of sub-resource blocks, the candidate interference terminals may be determined for each sub-resource block, and at least one dominant interference terminal may be determined from among the candidate interference terminals.

In various embodiments, in the case where the resource area is divided into a plurality of sub-resource blocks in the base station, the scheduler of the base station may transmit the number of sub-resource blocks into which the allocated resource area is divided together with information on RBs allocated to each target terminal. The sub-resource block is a fragment obtained by dividing a resource area allocated to a single terminal, and resource areas allocated to a single terminal may be divided into one or more sub-resource blocks.

Figure 11:
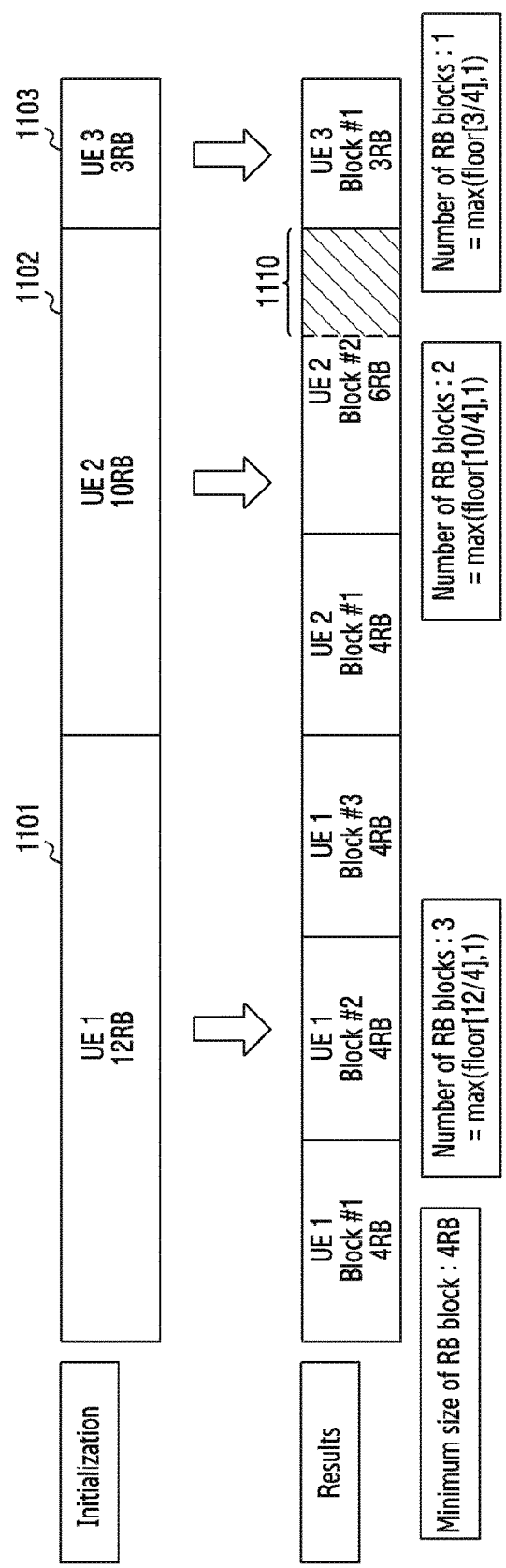
FIG. 11 illustrates an example of dividing resource areas allocated to terminals into a plurality of sub-resource blocks, respectively, according to the embodiment of the present disclosure.

FIG. 11 illustrates an example of dividing resource areas allocated to terminals into a plurality of sub-resource blocks, respectively, according to the embodiment of the present disclosure.

Referring to FIG. 11, if it is assumed that 12 RBs are allocated to UE 1, 10 RBs are allocated to UE 2, 3 RBs are allocated to UE 3, and the minimum size of sub-resource block is 4 RBs, the UE 1 may be divided into three sub-resource blocks (=12 RB/4 RB), the UE 2 may be divided into two sub-resource blocks (=10 RB/4 RB), and the UE 3 may have one sub-resource block (=3 RB/4 RB). However, since the UE 2 has two extra RBs, the second sub-resource block of the UE 2 may have 6 RBs (=4 RB+2 RB). Similarly, the one sub-resource block of UE 3 may have 3 RBs. "floor( )" is a function that gives as output the greatest integer that is less than or equal to a given value.

An algorithm for dividing the resource area allocation of the target terminal into sub-resource blocks is as follows.

The description will be made of an example in which the target terminal is allocated with a total of Alloc_RBs resource areas and divides the same into N_Interferers sub-resource blocks. The communication processor is provided with Alloc_RBs and N_Interferers from the scheduler, and calculates the size of a sub-resource block using the same, as follows.

$$RB\_size=\text{floor}(Alloc\_RB/N\_Interferer)$$

$$Last\_RB\_size=Alloc\_RB-RB\_size*(N\_Interferer-1)$$

Here, RB_size denotes the size of the remaining sub-resource block except for the last sub-resource block, and Last_RB_size denotes the size of the last sub-resource block.

If the maximum number of sub-resource blocks that can be processed by the communication processor is limited for each cell, the number of remaining sub-resource blocks indicates the number of sub-resource blocks that can be further divided in the current state. Since the number of terminals initially allocated with the resource areas is equal to the total number of sub-resource blocks, the number of remaining sub-resource blocks is as follows.

$$N\_Remain\_block=Max\_N\_block-$$
$$N\_block=Max\_N\_block-N\_Target\_UE$$

Here, N_Remain_block is the number of remaining sub-resource blocks, Max_N_block is the maximum number of sub-resource blocks, N_block is the total number of sub-resource blocks, and N_Target_UE is the number of terminals allocated with resource areas.

If there are no remaining sub-resource blocks, the resource area of the target terminal is divided into one or more sub-resource blocks based on the following equation.

$$RB\_size=\text{floor}(Alloc\_RB/N\_Interferer)$$

$$Last\_RB\_size=Alloc\_RB-RB\_size*(N\_Interferer-1)$$

If there are remaining sub-resource blocks, an operation of dividing the sub-resource blocks is performed.

For example, in the division of the sub-resource block, the sub-resource block having the largest number of resource areas is selected and the sub-resource block is divided to have a number of sub-resource blocks calculated by the following (operation (1)).

$$N\_Divide\_block=\min[\text{ceil}(Selected\_block\_size/Min\_block\_size)-1,N\_Remain\_block]+1$$

Here, N_Divide_block is the number into which the selected sub-resource blocks are divided, and Selected_block_size is the number of resource areas of the selected sub-resource blocks. Min_block_size is the minimum number of resource areas of the sub-resource blocks, which is calculated as shown in the following equation.

$$Min\_block\_size=\text{ceil}(N\_RB\_PUSCH/Max\_N\_block)$$

Here, N_RB_PUSCH is the number of resource areas used for the PUSCH.

Afterwards, since the total number of sub-resource blocks increases by dividing the selected sub-resource blocks, the number of remaining sub-resource blocks may be updated as follows (operation (2)).

$$N\_Remain\_block=N\_Remain\_block-(N\_Divide\_block-1)$$

Thereafter, operations (1) and (2) are repeated until there are no remaining sub-resource blocks.

Figure 12:
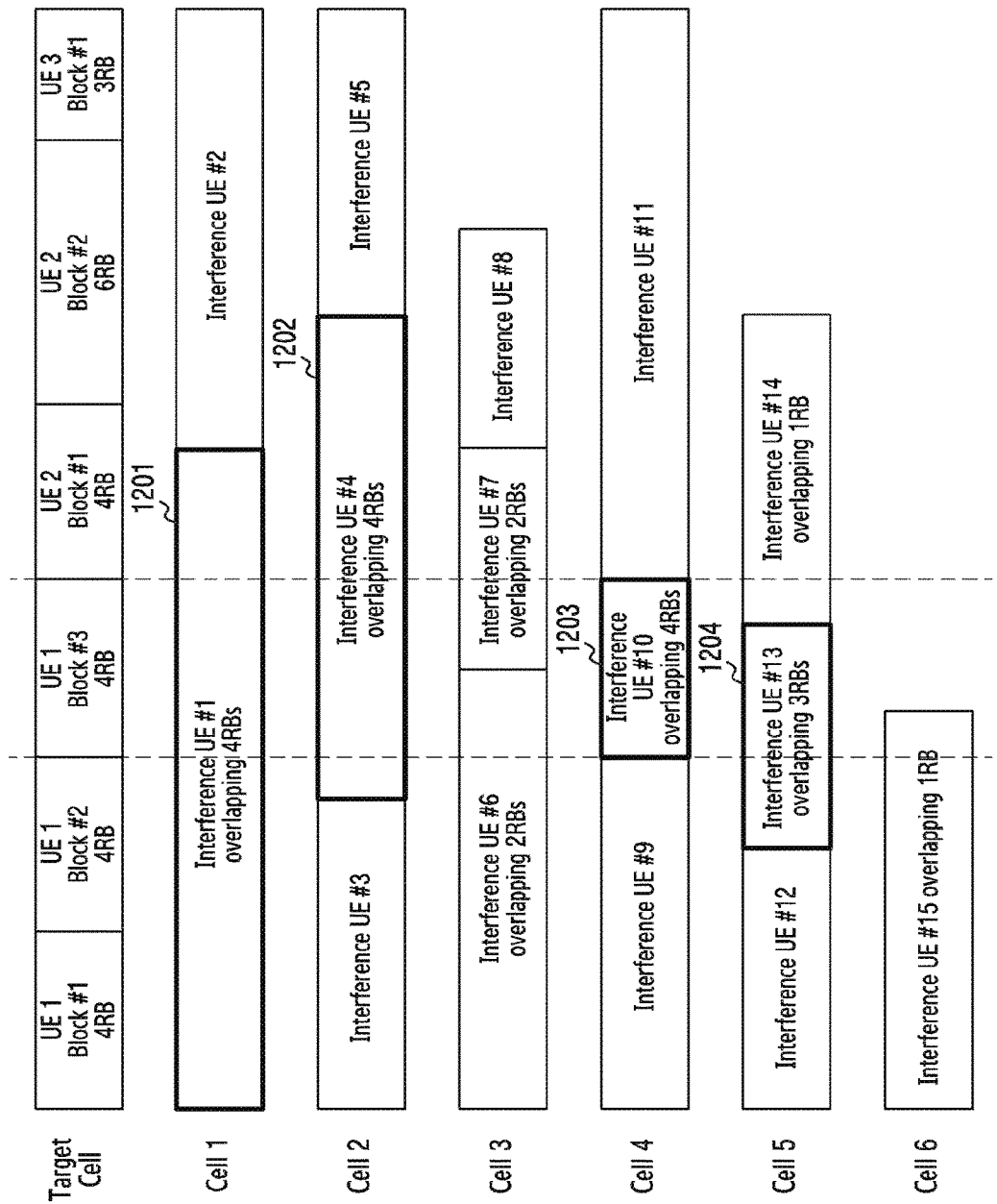
FIG. 12 illustrates an example of determining candidate interference terminals for each sub-resource block, according to the embodiment of the present disclosure.

FIG. 12 illustrates an example of determining candidate interference terminals for each sub-resource block according to an embodiment of the present disclosure.

FIG. 12 shows an example in which four candidate interference terminals are selected for each sub-resource block by the scheduling apparatus from among six neighboring base stations associated with the target base station.

For example, in order to select candidate interference terminals with respect to the third sub-resource block of the UE 1, the scheduling apparatus may: search for terminals of the neighboring cells, which overlap the third sub-resource block of the UE 1; determine the amount of interference for each terminal of the overlapping neighboring cells; and determine four neighboring terminals having a large amount of interference as candidate interference terminals. For example, the amount of interference may be determined by multiplying the reception power of the reference signal by the number of overlapping RBs.

In FIG. 12, the interference UE #1 of the neighboring cell 1 overlaps four RBs of the target cell (1201), the interference UE #4 of the neighboring cell 2 overlaps four RBs of the target cell (1202), the interference UE #6 of the neighboring cell 3 overlaps two RBs of the target cell, the interference UE #7 of the neighboring cell 3 overlaps two RBs of the target cell, the interference UE #10 of the neighboring cell 4 overlaps four RBs of the target cell (1203), the interference UE #13 of the neighboring cell 5 overlaps three RBs of the target cell (1204), and the interference UE #15 of the neighboring cell 6 overlaps one RB of the target cell.

In addition, the average magnitudes of reception power of the interference terminals (the interference UE #1, the interference UE #4, the interference UE #6, the interference UE #7, the interference UE #10, the interference UE #13, and the interference UE #15) may be P1, P2, P3, P4, P5, P6, and P7, respectively.

Then, when the amount of interference is determined as P1*4, P2*4, P3*2, P4*2, P5*4, P6*3, and P7*1, respectively, if the amounts of interference of P1*4, P2*4, P5*4, and P6*3 are greater than other amounts of interference, the interference UE #1 (1201), the interference UE #4 (1202), the interference UE #10 (1203), and the interference UE #13 (1204) may be determined as candidate interference terminals.

According to various other embodiments, the amount of interference may be determined only by the average magnitudes of the reception power of the interference terminals.

Figure 13:
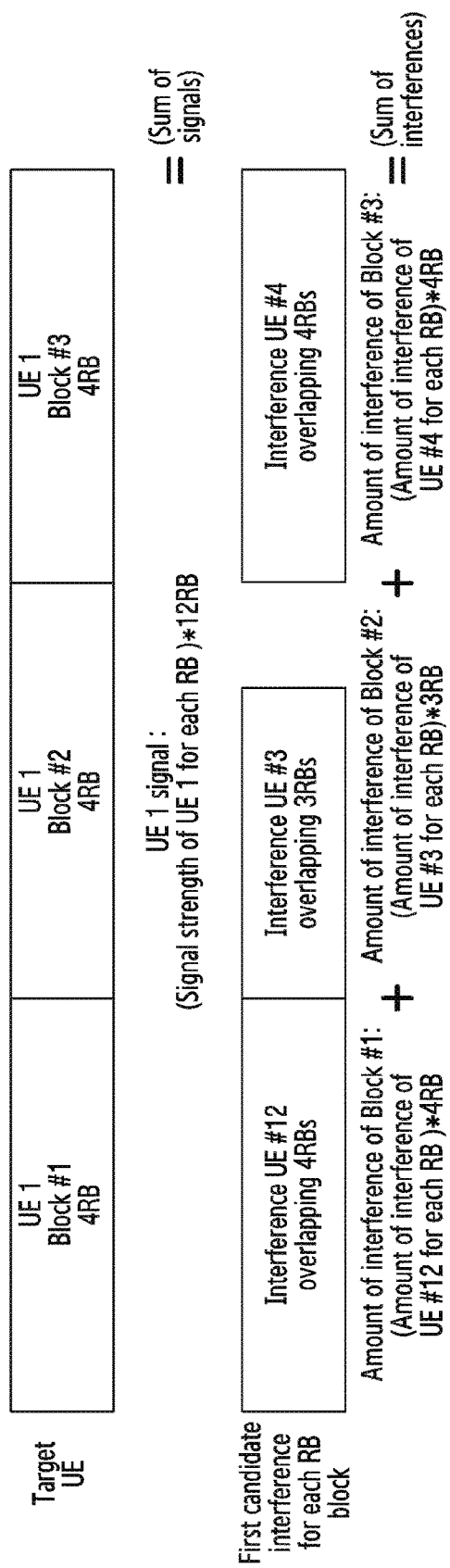
FIG. 13 illustrates an example of selecting a terminal to which a multi-cell interference cancellation technique is applied, according to the embodiment of the present disclosure.

FIG. 13 illustrates an example of selecting a terminal to which a multi-cell interference cancellation technique is to be applied according to the embodiment of the present disclosure.

FIG. 13 shows an example of calculating the SIR for each target terminal. For example, in the case where the resource area allocated to the target UE 1 is divided into three sub-resource blocks and each sub-resource block is comprised of 4 RBs, the sum of signals of the target UE 1 is (signal strength per RB)*(12 RBs).

In addition, it is assumed that one candidate interference terminal is the interference UE #12, the interference UE #3, and the interference UE #4, respectively, for each sub-resource block. For example, the interference terminal for the first sub-resource block of the target UE may be the interference UE #12, the interference terminal for the second sub-resource block of the target UE may be the interference UE #3, and the interference terminal for the third sub-resource block of the target UE may be the interference UE #4. Here, the interference UE #12 may overlap 4 RBs of the target UE, the interference UE #3 may overlap 3 RBs of the target UE, and the interference UE #4 may overlap 4 RBs of the target UE.

At this time, the amount of interference for the first sub-resource block of the target UE is (reception power for each RB of the interference UE #12)*(4 RBs), the amount of interference for the second sub-resource block of the target UE is (reception power for each RB of the interference UE #3)*(3 RBs), and the amount of interference for the first sub-resource block of the target UE is (reception power for each RB of the interference UE #4)*(4 RBs).

Here, the total amount of interference of the target UE may be determined as a sum of the respective sub-resource blocks.

Figure 14:
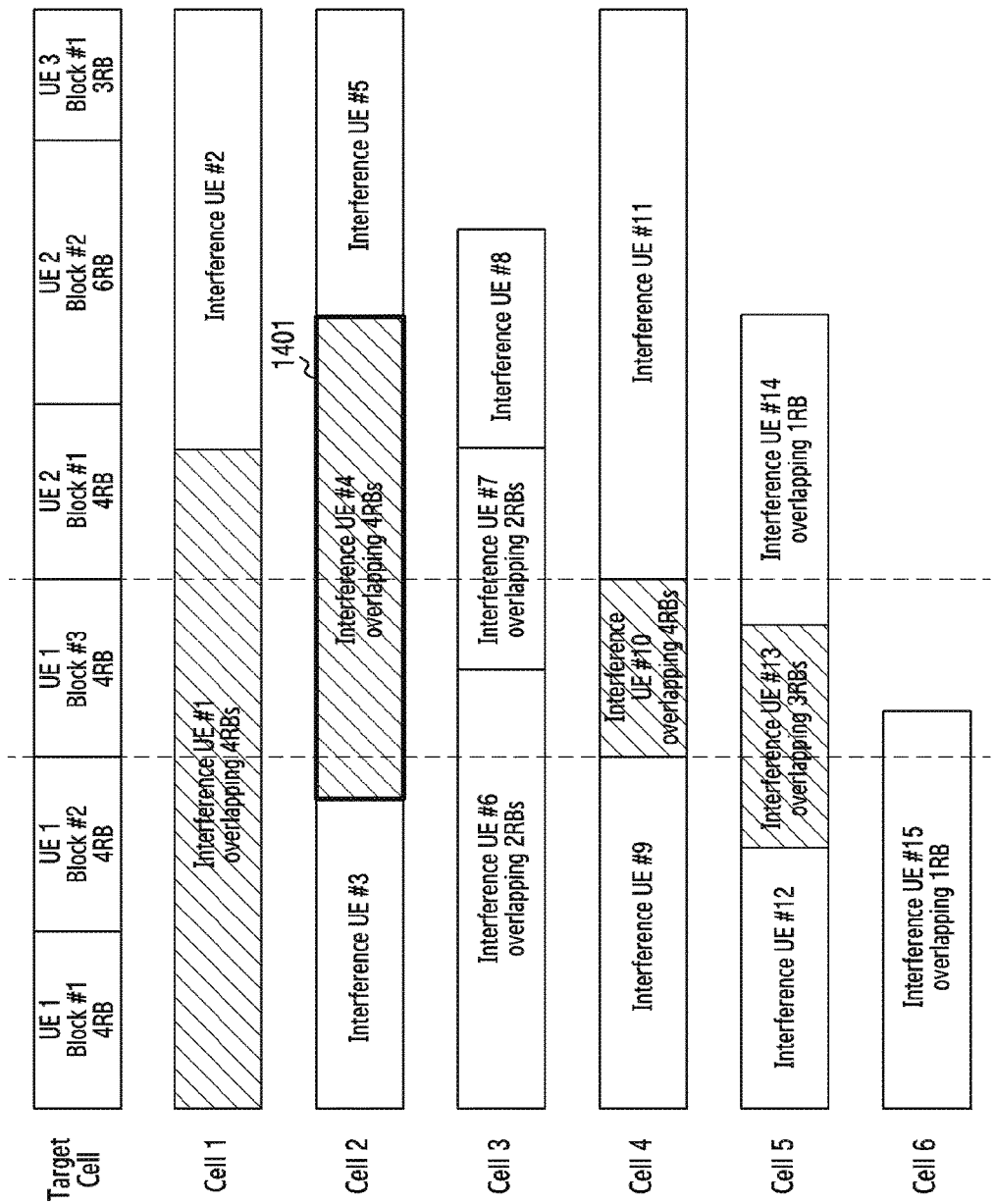
FIG. 14 illustrates an example of selecting one dominant interference terminal from among the candidate interference terminals, according to the embodiment of the present disclosure.

FIG. 14 shows an example of selecting one dominant interference terminal from the candidate interference terminals according to the embodiment of the present disclosure.

FIG. 14 shows an example in which one dominant interference terminal is selected from four candidate interference terminals (e.g., the interference UE #1, the interference UE #4, the interference UE #10, and the interference UE #13), which have been determined in FIG. 12.

For example, the terminal (e.g., the interference UE #4) having the largest instantaneous reception power of the DM-RS may be selected as a dominant interference terminal (1401) from among the four candidate interference terminals.

Figure 15:
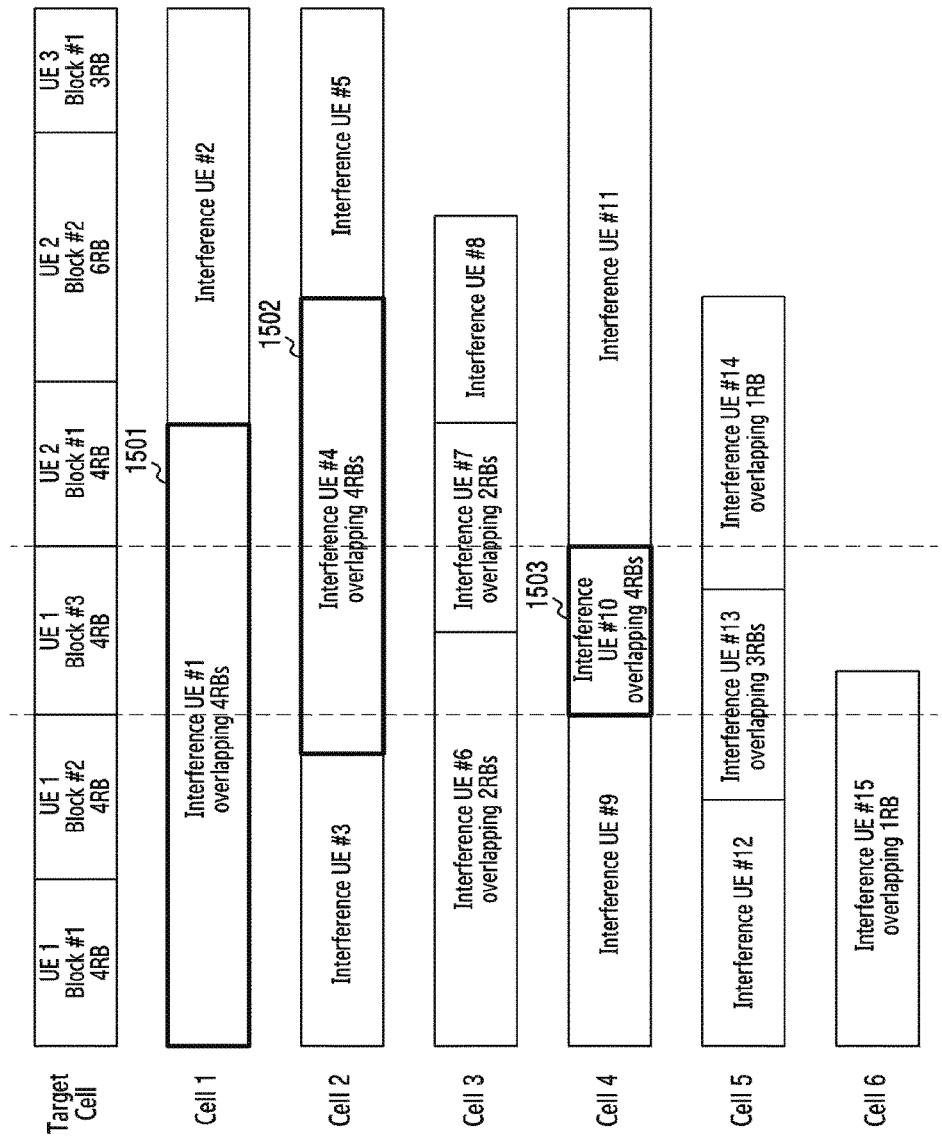
FIG. 15 illustrates an example of selecting three dominant interference terminals from among the candidate interference terminals, according to the embodiment of the present disclosure.

FIG. 15 illustrates an example of selecting three dominant interference terminals from the candidate interference terminals according to the embodiment of the present disclosure.

FIG. 15 shows an example in which three dominant interference terminals are selected from four candidate interference terminals (e.g., the interference UE #1, the interference UE #4, the interference UE #10, and the interference UE #13), which have been determined in FIG. 12.

For example, three interference terminals {i.e., the interference UE #1 (1501), the interference UE #4 (1502), and the interference UE #10 (1503)} are selected as dominant interference terminals in descending order of instantaneous reception power of the DM-RS from among four candidate interference terminals.

Methods according to embodiments stated in the claims and/or specifications may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The one or more programs may include instructions for allowing the electronic device to perform methods according to embodiments stated in the claims and/or specifications of the present disclosure.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, any combination of some or all of the may form a memory in which the program is stored. Further, a plurality of such memories may be included in the electronic device.

The programs may be stored in an attachable storage device that is accessible through a communication network, such as the Internet, the Intranet, a Local Area Network (LAN), Wide LAN (WLAN), or Storage Area network (SAN), or a communication network configured with a combination thereof. The storage device may access the electronic device through an external port.

Further, a separate storage device on a communication network may access a portable electronic device.

Although the embodiment has been described in the detailed description of the present disclosure, the present disclosure may be modified in various forms without departing from the scope of the present disclosure. Therefore, the scope of the present disclosure should not be defined as being limited to the embodiments, but should be defined by the appended claims and equivalents thereof.

The invention claimed is:

1. A method of operating a base station for interference cancellation in a wireless communication system, the method comprising:
   receiving, from a target terminal, an uplink signal comprising at least one interference signal generated by at least one interference terminal;
   identifying at least one dominant terminal from the at least one interference terminal based on a reception power of each of the at least one interference terminal;
   performing primary decoding for the uplink signal;
   generating a cancelling signal corresponding to an interference signal of the at least one dominant terminal if the primary decoding fails;
   performing a cancellation by applying the cancelling signal to the uplink signal; and
   performing secondary decoding for the uplink signal to which the cancelling signal has been applied.

2. The method of claim 1, further comprising:
   receiving, from a scheduling apparatus, information on the at least one interference terminal and information for channel estimation of the at least one interference terminal,
   wherein the cancelling signal is generated by using the information for the channel estimation and uplink decoded data of the at least one dominant terminal from a neighboring base station, and
   wherein the at least one interference terminal is identified among a plurality of terminals by the scheduling apparatus, based on a reception power of each of the plurality of terminals and an amount of resources allocated to the target terminal and the each of the plurality of terminals.

3. The method of claim 2, further comprising:
   receiving uplink decoded data of the at least one interference terminal from the neighboring base station associated with the at least one interference terminal.

4. The method of claim 2, wherein the identifying of the at least one dominant terminal comprises:
   measuring instantaneous reception power for a reference signal with respect to the at least one interference terminal; and
   identifying the at least one dominant terminal among the at least one interference terminal based on a magnitude of the measured instantaneous reception power.

5. The method of claim 1, wherein the performing of the primary decoding and the secondary decoding comprises:
   converting the uplink signal from a time-domain signal into a frequency-domain signal;
   estimating a channel of the target terminal or at least one terminal attached to a neighboring base station by measuring a reference signal among the frequency-domain signals;
   recovering a transmission signal of the target terminal based on the channel estimation and minimum mean-square error (MMSE) detection;
   converting the transmission signal of the target terminal from a frequency-domain signal into a time-domain signal;
   decoding the time-domain signal of the target terminal based on the corresponding channel decoding method; and
   performing error detection on the decoding.

6. The method of claim 1, further comprising:
   allocating uplink resources to a plurality of terminals comprising the target terminal; and
   transmitting, to a scheduling apparatus, uplink resource allocation information for each terminal and information related to channel estimation.

7. The method of claim 6, further comprising dividing the uplink resource area for each terminal into a plurality of sub-resource blocks.

8. A method of operating a scheduling apparatus for interference cancellation in a wireless communication system, the method comprising:
   receiving at least one piece of uplink resource allocation information for each terminal and information related to channel estimation from a plurality of base stations;
   identifying at least one interference terminal for each base station using the uplink resource allocation information; and
   transmitting information on the at least one identified interference terminal to a corresponding base station.

9. The method of claim 8, wherein the identifying of the at least one interference terminal comprises:
   identifying whether or not an uplink resource area of a target terminal overlaps, at least in part, uplink resource areas of a plurality of interference terminals;
   identifying an amount of interference of at least one interference terminal of which the uplink resource areas overlap; and
   identifying an interference terminal from among the at least one interference terminal according to the amount of interference.

10. The method of claim 9, wherein the amount of interference of the interference terminal is identified by at least one of a magnitude of instantaneous reception power when a reference signal of the interference terminal is received by a related target base station, and a number of sub-resource blocks that overlap sub-resource blocks of the uplink resource area of the interference terminal and sub-resource blocks of the uplink resource area of the target terminal.

11. The method of claim 9, further comprising identifying a target terminal to which an interference cancellation technique is to be applied in the corresponding base station using a signal-to-interference ratio (SIR).

12. The method of claim 11, wherein the signal-to-interference ratio of the target terminal is identified as a ratio of reception power of the target terminal to total reception power of at least one interference terminal associated with the target terminal.

13. An apparatus of a base station for interference cancellation in a wireless communication system, the apparatus comprising:
   a transceiver; and
   at least one processor, operatively connected to the transceiver, configured to:
      receive, from a target terminal, an uplink signal comprising at least one interference signal generated by at least one interference terminal,
      identify at least one dominant terminal from the at least one interference terminal based on a reception power of each of the at least one interference terminal,
      perform primary decoding for the uplink signal,
      generate a cancelling signal corresponding to an interference signal of the at least one dominant terminal if the primary decoding fails,
      perform a cancellation by applying the cancelling signal to the uplink signal, and perform secondary decoding for the uplink signal to which the cancelling signal has been applied.

14. The apparatus of claim 13, wherein the at least one processor is further configured to:
   receive, from a scheduling apparatus, information on the at least one interference terminal and information for channel estimation of the at least one interference terminal,
   wherein the cancelling signal is generated by using the information for channel estimation and uplink decoded data of the at least one dominant terminal from a neighboring base station, and
   wherein the at least one interference terminal is identified among a plurality of terminals by the scheduling apparatus, based on a reception power of each of the plurality of terminals and an amount of resources allocated to the target terminal and the each of the plurality of terminals.

15. The apparatus of claim 14, wherein the at least one processor is further configured to:
   receive uplink decoded data of the at least one interference terminal from the neighboring base station associated with the at least one candidate interference terminal.

16. The apparatus of claim 14, wherein the at least one processor is further configured to:
   measure instantaneous reception power for a reference signal with respect to the at least one interference terminal, and
   identify the at least one dominant terminal among the at least one interference terminal based on a magnitude of the measured instantaneous reception power.

17. The apparatus of claim 13, wherein the at least one processor is further configured to:
   convert the uplink signal from a time-domain signal into a frequency-domain signal,
   estimate a channel of the target terminal or at least one terminal attached to a neighboring base station by measuring a reference signal among the frequency-domain signals,
   recover a transmission signal of the target terminal based on the channel estimation and minimum mean-square error (MMSE) detection,
   convert the transmission signal of the target terminal from a frequency-domain signal into a time-domain signal,
   decode the time-domain signal of the target terminal based on the corresponding channel decoding method, and
   perform error detection on the decoding.

18. The apparatus of claim 13, wherein the at least one processor is further configured to:
   allocate uplink resources to a plurality of terminals comprising the target terminal, and
   transmit, to a scheduling apparatus, uplink resource allocation information for each terminal and information related to channel estimation.

19. The apparatus of claim 18, wherein the at least one processor is further configured to divide the uplink resource area for each terminal into a plurality of sub-resource blocks.

20. The apparatus of claim 13, wherein the at least one processor is further configured to transmit a result of the decoding to at least one of corresponding neighboring base station when the primary decoding or the secondary decoding has no error.

* * * * *